United States Patent
Rahm et al.

(10) Patent No.: US 11,499,511 B2
(45) Date of Patent: Nov. 15, 2022

(54) METHOD FOR CONTROLLING AN INTERNAL COMBUSTION ENGINE SYSTEM

(71) Applicant: VOLVO TRUCK CORPORATION, Gothenburg (SE)

(72) Inventors: Fredrik Rahm, Hörby (SE); Johan Carlén Andersson, Lund (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/270,296

(22) PCT Filed: Aug. 23, 2018

(86) PCT No.: PCT/EP2018/072725
§ 371 (c)(1),
(2) Date: Feb. 22, 2021

(87) PCT Pub. No.: WO2020/038577
PCT Pub. Date: Feb. 27, 2020

(65) Prior Publication Data
US 2021/0180545 A1  Jun. 17, 2021

(51) Int. Cl.
*F02M 26/49*  (2016.01)
*F02M 26/33*  (2016.01)
(Continued)

(52) U.S. Cl.
CPC ........... *F02M 26/49* (2016.02); *F02D 41/062* (2013.01); *F02D 41/22* (2013.01); *F02M 26/33* (2016.02); *F02M 26/34* (2016.02)

(58) Field of Classification Search
CPC ................ F02B 29/0468; F02M 26/35; F02M 35/10157; F02M 26/34; F02M 26/49;
(Continued)

(56) References Cited

U.S. PATENT DOCUMENTS 3,783,848 A * 1/1974 Ranft ..................... F02M 26/61
                                                    123/568.29
4,373,498 A * 2/1983 Ushimura .............. F02M 26/34
                                                    123/568.21
(Continued)

FOREIGN PATENT DOCUMENTS

CN      103912413 A    7/2014
CN      105484878 A    4/2016
(Continued)

OTHER PUBLICATIONS

International Search Report and Written Opinion dated May 28, 2019 in corresponding International PCT Application No. PCT/EP2018/072725, 8 pages.
(Continued)

*Primary Examiner* — Sizo B Vilakazi
*Assistant Examiner* — Brian R Kirby
(74) *Attorney, Agent, or Firm* — Venable LLP; Jeffri A Kaminski

(57) ABSTRACT

The invention relates to a method for controlling an internal combustion engine system (2), wherein the internal combustion engine system (2) is provided with an air intake duct (3), an exhaust gas duct (4) and an exhaust gas recirculation (EGR) system (5), wherein the EGR system (5) comprises an EGR conduit (6) that fluidly connects the exhaust duct (4) and the intake duct (3), and wherein a gas feeding device (7) is arranged in the EGR conduit (6), said gas feeding device (7) being configured to feed exhaust gas from the exhaust duct (4) to the intake duct (3) during operation of the engine system (2). The method is characterized in that it comprises the step of: detecting a risk of freezing of condensed water in the EGR conduit (6), and, in case such a risk is detected and in case the gas feeding device (7) is not in operation, operating the gas feeding device (7). The invention also relates to an internal combustion engine system (2) config-
(Continued)

ured for being operated by such a method and to a vehicle (1) provided with such an engine system (2). The invention further relates to means for controlling the above method.

18 Claims, 3 Drawing Sheets

(51) Int. Cl.
*F02M 26/34* (2016.01)
*F02D 41/06* (2006.01)
*F02D 41/22* (2006.01)

(58) Field of Classification Search
CPC ........ F02M 26/33; F02M 26/50; Y02T 10/12; Y02T 10/40; F02D 41/0007; F02D 41/221; F02D 41/22; F02D 23/00; F02D 23/005; F02D 23/02; F02D 41/062; F02D 2200/021; F02D 41/0055; F02D 41/064
USPC .................. 123/559.3, 565, 568.21, 568.12
See application file for complete search history.

(56) References Cited

U.S. PATENT DOCUMENTS

| | | | | | |
|---|---|---|---|---|---|
| 4,961,413 | A | * | 10/1990 | Grey | F02M 26/67 123/568.26 |
| 5,349,936 | A | * | 9/1994 | Uchinami | F02M 26/49 73/114.74 |
| 5,657,630 | A | * | 8/1997 | Kjemtrup | F02M 25/0225 123/563 |
| 6,138,649 | A | * | 10/2000 | Khair | F02M 26/07 60/599 |
| 6,164,071 | A | * | 12/2000 | Shao | F02M 26/40 123/568.21 |
| 6,435,166 | B1 | * | 8/2002 | Sato | F02M 26/05 123/568.21 |
| 7,870,718 | B2 | * | 1/2011 | Chillar | F02M 26/50 60/39.12 |
| 10,100,788 | B2 | * | 10/2018 | Choi | F02M 26/35 |
| 10,539,070 | B2 | * | 1/2020 | Kemmerling | F02B 37/04 |
| 10,605,161 | B2 | * | 3/2020 | Banker | F02B 37/04 |
| 2001/0045090 | A1 | * | 11/2001 | Gray, Jr. | F02D 41/0275 60/289 |
| 2002/0129604 | A1 | * | 9/2002 | Wildner | F02B 39/12 60/605.1 |
| 2003/0101716 | A1 | * | 6/2003 | Hirooka | F01N 3/22 60/277 |
| 2003/0154716 | A1 | * | 8/2003 | Redon | F02M 26/37 60/605.2 |
| 2003/0232226 | A1 | * | 12/2003 | Morishima | H01M 8/04097 429/413 |
| 2004/0079079 | A1 | * | 4/2004 | Martin | F02B 29/0406 60/605.2 |
| 2004/0187852 | A1 | * | 9/2004 | Kawamura | F02B 39/10 123/564 |
| 2005/0000497 | A1 | * | 1/2005 | Nakai | F02M 26/07 123/568.2 |
| 2005/0189343 | A1 | * | 9/2005 | Griffin | G01F 1/6986 219/494 |
| 2006/0030450 | A1 | * | 2/2006 | Kyle | B60L 50/16 477/3 |
| 2009/0249783 | A1 | * | 10/2009 | Gokhale | F02M 31/08 60/602 |
| 2009/0260603 | A1 | * | 10/2009 | Bucknell | F02D 41/0065 123/568.19 |
| 2009/0320467 | A1 | * | 12/2009 | Kardos | F02M 26/05 60/605.2 |
| 2010/0300068 | A1 | * | 12/2010 | Enomoto | F02D 41/1494 60/273 |
| 2011/0041814 | A1 | | 2/2011 | Kardos et al. | |
| 2011/0151760 | A1 | * | 6/2011 | Olsen | F23L 17/14 454/41 |
| 2013/0291536 | A1 | * | 11/2013 | Koch | F02M 26/23 60/599 |
| 2014/0190459 | A1 | * | 7/2014 | Horiuchi | F01P 3/20 123/568.12 |
| 2015/0089941 | A1 | * | 4/2015 | Maekawa | F02B 29/0406 60/605.2 |
| 2016/0245240 | A1 | | 8/2016 | Pursifull et al. | |
| 2016/0281652 | A1 | * | 9/2016 | Takasu | F02D 41/0005 |
| 2016/0333827 | A1 | * | 11/2016 | Smiljanovski | F02M 26/07 |
| 2018/0119624 | A1 | * | 5/2018 | Schwartz | F01N 3/0205 |
| 2018/0202349 | A1 | * | 7/2018 | Kindl | F02B 39/10 |
| 2018/0320570 | A1 | * | 11/2018 | Car | F01N 13/008 |
| 2019/0120101 | A1 | * | 4/2019 | Dadam | F01N 9/00 |
| 2019/0145362 | A1 | * | 5/2019 | Dudar | F02M 35/10393 123/184.21 |
| 2019/0211845 | A1 | * | 7/2019 | Iizuka | F04D 29/706 |
| 2019/0257231 | A1 | * | 8/2019 | Dudar | F01N 13/10 |
| 2019/0277207 | A1 | * | 9/2019 | Matoba | F02B 39/12 |
| 2019/0277208 | A1 | * | 9/2019 | Matoba | F04D 25/026 |
| 2019/0323457 | A1 | * | 10/2019 | Rohrssen | F02M 26/05 |
| 2020/0182206 | A1 | * | 6/2020 | Oh | F02D 41/0052 |
| 2020/0194812 | A1 | * | 6/2020 | Jeon | H01M 8/04753 |

FOREIGN PATENT DOCUMENTS

| | | | |
|---|---|---|---|
| CN | 105683538 A | 6/2016 | |
| CN | 107542555 A | 1/2018 | |
| JP | 2011190743 A | 9/2011 | |
| JP | 5169853 B2 | 3/2013 | |
| JP | 2015068273 A | 4/2015 | |
| JP | 2016056721 A | 4/2016 | |
| JP | 2018040407 A | * 3/2018 | ............. F02B 39/12 |
| JP | 2018040409 A | * 3/2018 | ........... F02D 23/005 |
| WO | 2013035296 A1 | 3/2013 | |

OTHER PUBLICATIONS

Chinese Office Action dated Jul. 12, 2022 in corresponding Chinese Patent Application No. 201880096830.5, 17 pages.

* cited by examiner

METHOD FOR CONTROLLING AN INTERNAL COMBUSTION ENGINE SYSTEM

CROSS-REFERENCE TO RELATED APPLICATIONS

This application is a U.S. National Stage application of PCT/EP2018/072725, filed Aug. 23, 2018, and published on Feb. 27, 2020, as WO 2020/038577 A1, all of which is hereby incorporated by reference in its entirety.

TECHNICAL FIELD

The invention relates to a method for controlling an internal combustion engine system provided with e.g. an EGR system and a gas feeding device for feeding exhaust gas in the EGR system. The invention also relates to an internal combustion engine system, a vehicle and controlling devices for controlling the above method.

The invention can typically be applied in heavy-duty vehicles, such as trucks, buses and construction equipment, but can also be applied in other types of applications and in other types of vehicles and vessels. Although the invention will be described with respect to a truck, the invention is not restricted to this particular vehicle.

BACKGROUND

EGR (Exhaust Gas Recirculation) is a well-known means for reducing the amounts of nitrogen oxide (NOx) in the exhaust gas of internal combustion engines, for instance diesel engines arranged for propulsion of vehicles, such as trucks. A part of the exhaust gas is recirculated to the intake side of the engine, which lowers the maximum combustion temperature in the engine and reduces the production of NOx.

An EGR system can be arranged in different ways but includes at least some form of EGR channel that fluidly connects the exhaust side and the intake side of the engine. Commonly, an EGR system includes an EGR flow control valve and an EGR cooler.

Control of the EGR flow in EGR systems is associated with various challenges, such as fluctuating intake and exhaust pressures, hardware durability problems due to high exhaust gas temperatures and soot deposition, condensation and corrosion in EGR cooler, etc. A further challenge is that during certain operational conditions in many engines, and during most of the time for certain engines provided with an efficient turbo arrangement, the pressure at the intake side is higher than at the exhaust side so there is no driving force for recirculating the exhaust gas.

To overcome the challenge related to a higher pressure at the intake side than at the exhaust side U.S. Pat. No. 6,435,166 proposes the use of a gas feeder (an EGR pump/compressor) for feeding gas from the exhaust side to the intake side. Although such a gas feeder seems to solve the intended problem this solution is rare on commercial engines, possibly due to durability problems.

Alternative ways of dealing with a higher pressure at the intake side is to make use of a variable geometry turbo (VGT) arrangement for controlling the exhaust gas pressure (i.e. for keeping the exhaust gas pressure sufficiently high). A drawback of such a VGT arrangement is a fuel consumption penalty related to the increased exhaust back pressure. Another way is to supply EGR into the intake duct via a venturi nozzle. A drawback of venturis is that they are typically associated with a significant loss in pressure, in particular for large flows of gas. A further way is to generate a pulsed EGR flow by arranging a non-return valve in the EGR conduit that provides for a flow towards the intake side each time there is pulse of exhaust gas but where return flow between the pulses is prevented. A drawback related to pulsed EGR flow is difficulties in controlling the flow.

There is thus a need for an EGR system that provides for an effective and reliable recirculation of exhaust gas also when the pressure is higher on the intake side than on the exhaust side.

SUMMARY

An object of the invention is to provide a method and a device, which method/device provides for, compared to known methods and devices, a more effective and reliable recirculation of exhaust gas in an internal combustion engine system when the pressure is higher on the intake side than on the exhaust side.

According to a first aspect of the invention, the object is achieved by a method according to claim 1. According to a second aspect of the invention, the object is achieved by a device (engine system and vehicle) according to the independent device claim. According to a further aspect of the invention, the object is achieved by a computer-related product/medium or a control unit for controlling the method.

The method relates to a method for controlling an internal combustion engine system, wherein the internal combustion engine system is provided with an air intake duct, an exhaust gas duct and an exhaust gas recirculation (EGR) system, wherein the EGR system comprises an EGR conduit that fluidly connects the exhaust duct and the intake duct, and wherein a gas feeding device is arranged in the EGR conduit, said gas feeding device being configured to feed exhaust gas from the exhaust duct to the intake duct during operation of the engine system.

The method is characterized in that it comprises the step of: detecting a risk of freezing of condensed water in the EGR conduit; and, in case such a risk is detected and in case the gas feeding device is not in operation, operating the gas feeding device.

The method is intended to be carried out when the engine system has cooled down some time after having turned off the general operation of the engine system. A main purpose of the method is to prevent freezing of the gas feeding device and thereby prevent freezing-related damage to the gas feeding device or to a drive source/motor arranged to drive the gas feeding device. If water is present in the gas feeding device, that typically is equipped with rotary members intended to rotate inside a surrounding housing, and if this water is allowed to freeze, there is a risk that the gas feeding device or the drive source will be damaged, either during the freezing process when the water expands while forming ice or when the engine system, including the gas feeding device, is started. According to the invention the risk of freezing is detected and, if so (for instance because the outside temperature is below 0° C.), the gas feeding device is operated so as to remove the water from the device and/or so as to keep the moveable parts of the device in motion to avoid freezing inside the device. The method is of course of primary interest for engine systems used under cold conditions, such as engine systems provided onto vehicles operating in e.g. Alaska, Canada, Scandinavia, high-altitude countries, etc. The method may be carried out on a vehicle that has been parked for a long time.

The method thus provides for an effective and reliable recirculation of exhaust gas, in particular in an internal combustion engine system where the pressure is higher on the intake side than on the exhaust side, in that the method eliminates or at least reduces durability problems related to gas feeding devices used for feeding recirculated exhaust gas. In short, the method contributes to making EGR gas feeding devices of interest for commercial engines.

As a response to the freeze-risk detection, the gas feeding device may be operated in a normal direction (i.e. the direction used during normal operation of the engine system) or in a reverse direction, or in alternating directions. That is, rotary members of the gas feeding device may be rotated in the normal rotational direction or in the reverse direction, or be rotated back and forth in alternating rotational directions. This operation of the gas feeding device has an additional advantageous effect in that it may at least partly remove deposited material (soot etc.) that may have accumulated in the gas feeding device. This effect is likely to be particularly significant when the gas feeding device is operated in the reverse direction. Besides preventing freezing, the above method may thus also improve the (long-term) function of the gas feeding device (since it may prevent long-term build-up of deposited material).

In an embodiment the step of detecting the freezing risk comprises the step of determining a temperature in or close to the gas feeding device. The temperature may be directly measured in or close to the gas feeding device but it is also possible to measure or determine in some other way the temperature at some distance from the gas feeding device and calculate or estimate the temperature in or close to the gas feeding device. Various approximation may be used since it is not critical that the exact temperature is determined; it is sufficient that a risk of freezing is detected. A threshold value, for instance 3° C., can be set for the temperature and be used as a trigger for operating the gas feeding device (if not already in operation). That is, if the determined temperature is below the threshold value the gas feeding device is started.

In an embodiment the step of determining the temperature comprises at least two temperature determinations carried out at different points in time so as to allow a determination of a change of the temperature in or close to the gas feeding device. This provides for the use of, in addition to the threshold value for the temperature, a threshold value also for the (rate of) change of the temperature as a trigger for operating the gas feeding device. The number of temperature determinations can of course be much higher than two; the temperature may be determined e.g. each second or each minute. The determination of the change of the temperature can be rather rough, it might e.g. be sufficient to classify the temperature as increasing, decreasing or constant using a time base of, say, 10 min (and using a reasonable accuracy in the classification). As an example, the combined thresholds can be used to decide to start operation of the gas feeding device if the temperature is 3° C. and decreasing but to decide not to start operation of the gas feeding device if the temperature is 3° C. but increasing. Various variants are possible.

In an embodiment the step of detecting the freezing risk comprises the step of determining a humidity in the EGR conduit. The humidity may be measured in the EGR conduit by means of a humidity sensor or may be calculated/estimated based on a determined temperature and information on engine system operating parameters prior to turning off the general operation of the engine system. Knowledge of the humidity can be used to detect an EGR condensation risk and can therefore be used in the step of detecting the risk of freezing of condensed water in the EGR conduit. For instance, in some engine systems it may be that if the humidity is below a certain threshold the amount of condensed water can be considered to be so small that it is not required to operate the gas feeding device even if the determined temperature indicates that there is a freezing risk.

In an embodiment the step of operating the gas feeding device is carried out so as to pump any condensed water out from the EGR conduit or at least out from the gas feeding device. This is very useful if condensed water has accumulated in the gas feeding device. Most, if not all, devices configured to feed gas can to some degree also feed/pump water (although great caution might be needed to avoid damages). The pumping of water can be done in either direction of the EGR conduit with reverse or normal rotational direction of a rotary member in the gas feeding device and the pumping direction to choose depends e.g. on where the gas feeding device is positioned in the EGR conduit in relation to intake duct, exhaust duct, EGR cooler, etc. The pumping operation can be terminated, i.e. the gas feeding device can be turned off, when the water has been removed, which might take only some seconds.

In an embodiment the step of operating the gas feeding device is carried out by operating the gas feeding device in a low-power mode in which the capability of the gas feeding device to feed gas is smaller than during normal operational conditions but where moving parts of the gas feeding device are kept in motion. This is not the same as pumping out water but is instead a form of "creep mode" for the gas feeding device useful at low temperatures for keeping movable parts, such as rotary members, in motion and thereby prevent freezing in the gas feeding device and prevent that the moveable parts get stuck. For instance, rotary members may be rotated one round per minute or similar. Continuous motion of the moveable parts is preferred. The gas feeding device may be operated in the low-power mode for a relatively long time (hours, days, or even longer depending on e.g. power demand and available energy, such as power demand for an electric motor used for driving the gas feeding device and available electric energy in an electric energy storage device/battery). The gas feeding device may be set in the low-power ("creep") mode after the step of pumping out water from the gas feeding device.

In an embodiment the step of operating the gas feeding device in the low-power mode comprises the step of: determining whether a rotational friction of a rotary member of the gas feeding device exceeds a threshold value, and, in case the threshold value is exceeded, increasing a drive power of a drive motor arranged to drive the gas feeding device and the moving parts to a power level higher than a power level normally used in the low-power mode. An increased rotational friction of such a rotary member, i.e. a rotational friction above the threshold, indicates that freezing may have started and/or that accumulations of deposited material may partly prevent free rotation of the rotary member. Increasing the drive power of the drive motor can in such a situation be useful for increasing the rotational speed and thereby securing that freezing is avoided and/or increasing the chances of removing the deposited material. The increased drive power may be used during a certain predetermined time period or until a further determination of the rotational friction shows that it has fallen below the threshold.

The determination of the rotational friction may comprise one or more of the following steps:
  measuring a torque applied to the rotary member;

measuring the driving power of the drive motor, such as a drive motor current of an electric drive motor arranged to rotate a rotary member of the gas feeding device;

measuring an actual rotational speed of a rotary member; and/or measuring a response time of a rotary member between a change in driving power and a resulting change of rotational speed.

The rotational friction can thus be determined indirectly from different measurements and calculations and combinations thereof.

In an embodiment the method is carried out within a threshold time interval after switching off the internal combustion engine system. The threshold time may be adjusted depending on e.g. the ambient/outdoor temperature. As an example, the method might be automatically started one hour after switching off the engine system (and after parking the vehicle onto which the engine system is arranged) if the ambient temperature is between 0° C. and −3° C. If the ambient temperature is lower the method can be automatically started after a shorter time period. In this case the trigger for starting the method is thus a certain time period after switching off in combination with an ambient temperature, which is in contrast to the example given above where a determined temperature in or close to the gas feeding device works as the trigger. Both triggers may be activated so that the method can be started as a response to either of the triggers.

In an embodiment the method is carried out within an arbitrary interval after switching off the internal combustion engine system. This means that the initiation of the method is not strictly related to the point of time of switching off the engine system. Instead the method can be started as a response to a certain temperature (ambient temperature or temperature in or close to the gas feeding device) or other trigger, such as a manual action. If there is no freezing risk at all the method may be completely inactivated (but may still be activated and run to remove accumulated deposits).

In an embodiment the gas feeding device is configured to feed exhaust gas by means of at least one rotating member.

In an embodiment the gas feeding device is configured to feed exhaust gas by means of a displacement pump, preferably a Roots type blower having a pair of rotors provided with meshing lobes. Such a pump is suitable for feeding the exhaust gas but seems to be unreliable in this particular application if not subject to e.g. anti-freezing measures and possibly also recurrent monitoring of its function and various cleaning actions to remove depositions of soot etc.

In an embodiment the engine system comprises a drive motor, such as an electric motor, arranged to drive the gas feeding device. The drive motor is typically arranged to rotate rotary members of the gas feeding device. An electric drive motor is particularly suitable for driving the gas feeding device since such a motor relatively can be controlled to drive the device at different speeds and in different directions and also to start or stop at a distinct point in time.

According to the second aspect the invention relates to an internal combustion engine system configured to control anyone of the above method steps.

According to a variant of the second aspect the invention relates to a vehicle comprising an internal combustion engine system of the above type.

According to the further aspect the invention relates to:

a computer program product comprising program code means for controlling the steps of the above method when said program product is run on a computer;

a computer readable medium carrying a computer program comprising program code means for controlling the steps of the above method when said program product is run on a computer; and a control unit for controlling the internal combustion engine system of the above type, the control unit being configured to control the steps of the above method.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
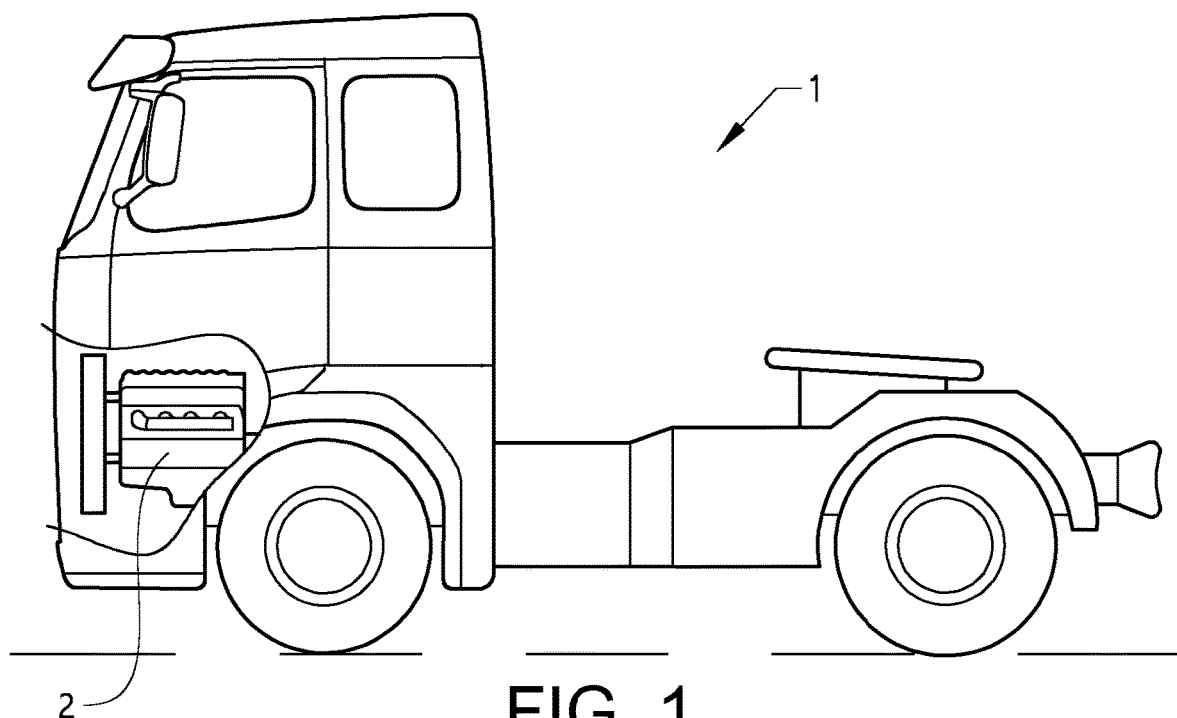
FIG. 1 is a schematic view of a vehicle/truck provided with an internal combustion engine system according to the invention.

FIG. 1 shows a schematic view of a truck 1 provided with an internal combustion engine system 2 according to the invention.

Figure 2:
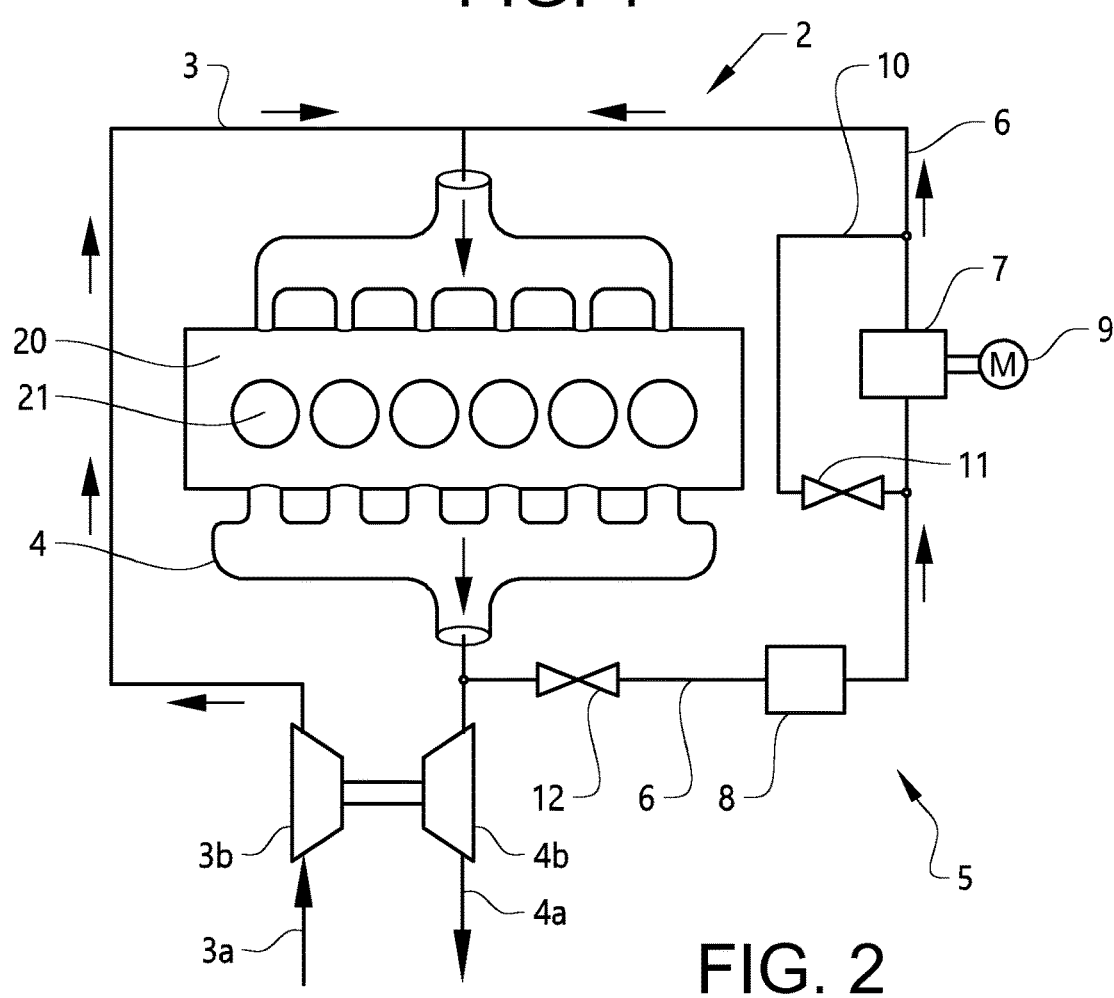
FIG. 2 is a schematic view of the internal combustion engine system according to FIG. 1.

FIG. 2 shows a schematic view of the internal combustion engine system 2 according to FIG. 1. The engine system 2 is provided with an air intake duct 3, an exhaust gas duct 4 and an exhaust gas recirculation (EGR) system 5. Intake air 3a is compressed in a turbo compressor 3b before entering the intake duct 3. Exhaust gas 4a leaves the schematically illustrated engine system 2 after having passed through an exhaust turbine 4a that drives the turbo compressor 3b. The air intake duct 3 guides air to a plurality of cylinders 21 (in this example six) arranged in an engine block 20 and the exhaust duct 4 leads the exhaust gas away from the cylinders 21 and the engine block 20.

In line with conventional engine systems each cylinder 21 is provided with a piston (not shown) as well as intake and exhaust valves (not shown), wherein the pistons are connected to a crankshaft (not shown) further connected to driving wheels of the vehicle 1 via various transmissions (not shown). Fuel supply and exhaust gas aftertreatment equipment is not shown in the figures.

The EGR system 5 comprises an EGR conduit 6 that fluidly connects the exhaust duct 4 and the intake duct 3. To provide for a flow of EGR when the pressure is higher in the 25 intake duct 3 than in the exhaust duct 4 a gas feeding device 7 configured to feed exhaust gas from the exhaust duct 4 to the intake duct 3 is arranged in the EGR conduit 6. The gas feeding device 7 is in this example a Roots type blower (see FIG. 3). A drive motor 9, in this case an electric motor, is arranged to drive the gas feeding device 7, which in this case means that the drive motor 9 is arranged to rotate rotary members 71, 72 of the 30 gas feeding device 7 (see FIG. 3).

The EGR system 5 further comprises: an EGR valve 12 for opening/closing of the EGR conduit 6 (the gas feeding device 7 can also function as EGR valve, see below); an EGR cooling device 8 arranged to allow for cooling of the exhaust gas flowing through the EGR 35 conduit 6; an EGR bypass conduit 10 arranged in fluid communication with the EGR conduit 6 upstream and downstream of the gas feeding device 7 so as to allow for an EGR flow that by-passes the gas feeding device 7; and a bypass valve 11 arranged in the EGR bypass conduit 10.

The engine system 2 further comprises a control unit (not shown) configured to control parts and functions of the engine system 2 and to control e.g. all method steps described in this disclosure. The control unit receives information from various sensors (not shown) arranged in the engine system 2. The principle function of control units for controlling operation of internal combustion engines and engine systems is well known in the art.

During normal operation of the engine system 2 the pressure is higher in the intake duct 3 than in the exhaust duct 4, the EGR valve 12 is open, the bypass valve 11 is closed, and the gas feeding device 7 feeds exhaust gas through the EGR conduit 6 from the exhaust duct 4 to the intake duct 3. The gas feeding device 7 can function as an EGR valve by e.g. turning it off and lock it in a stationary (non-rotating) position that substantially prevents through-flow. This is done by controlling the electric drive motor 9. The EGR valve 12 is thus in this example not necessary. When the gas feeding device 7 is turned off and locked, opening of the bypass valve 11 allows for a flow of exhaust gas through the EGR bypass conduit 10. The gas feeding device 7 may be turned off but set in a mode that allows through-flow, i.e. the rotary members 71, 72 of the Roots blower are allowed to rotate.

Figure 3:
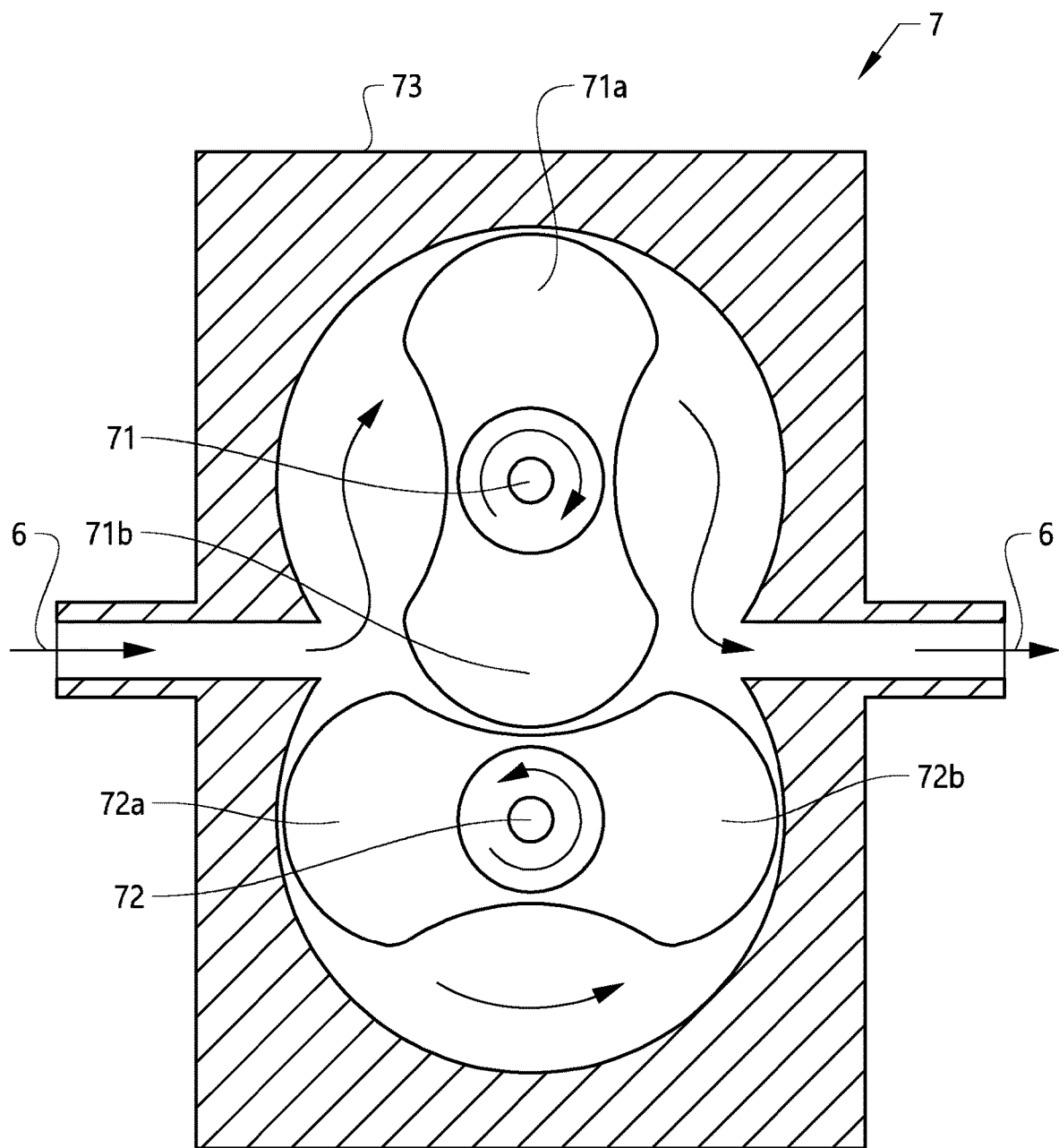
FIG. 3 is a schematic sectional view of a gas feeding device in the form of a Roots type blower.

FIG. 3 shows a schematic view of the gas feeding device 7 arranged in the EGR conduit 6, wherein the gas feeding device 7 is in the form of a Roots type blower having first and 25 second rotary members 71, 72 provided with meshing lobes 71a, 71b, 72a, 72b configured to rotate inside a surrounding housing 73. Roots type blowers are well known as such. In some Roots type blowers each rotary member is provided with more than two lobes. In relation to FIG. 3 an incoming EGR flow in the EGR conduit 6 passes an inlet at the left and is displaced (as indicated by the arrows) by the rotary members 71, 72 to an outlet at the right and further into the EGR conduit 6 downstream of the gas feeding device 7 (towards the intake duct 3 and the cylinders 21 as indicated in FIG. 1).

Figure 4:
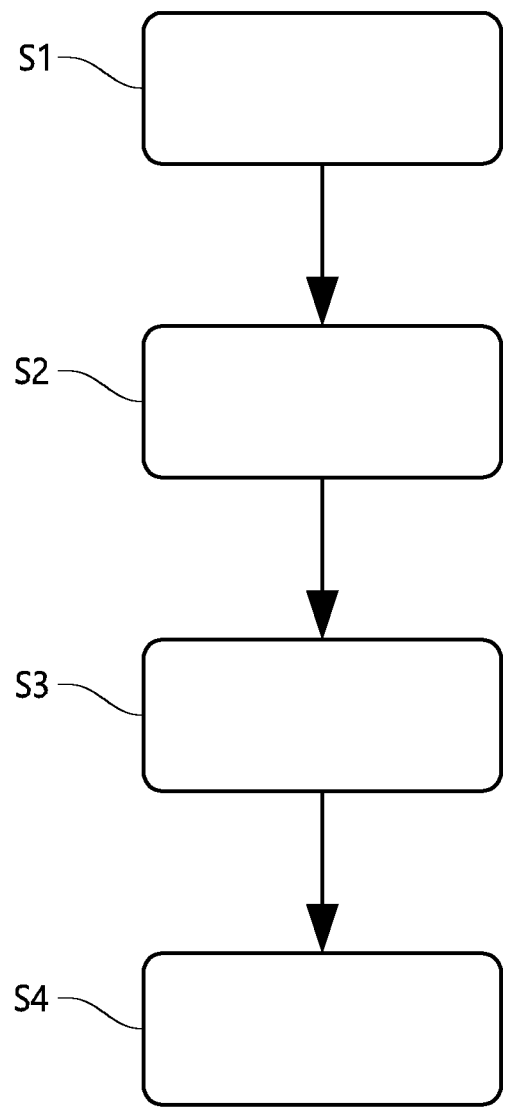
FIG. 4 is a flow diagram for an exemplary embodiment of the inventive method.

FIG. 4 shows a flowchart of an example of a method of controlling the internal combustion engine system 2 in a situation where the general operation of the engine system 2 has been switched off some time ago (i.e. pistons, valves, turbo compressor 3B etc. do not move, no air is fed through the intake duct 3, no exhaust gas is produced, the gas feeding device 7 is not in operation but is operable, etc.). The exemplified method illustrates detection of a risk of freezing of condensed water in the EGR conduit 6 (that might damage the gas feeding device 7) and which action that is taken if such a risk is detected. Further actions are discussed below.

The step of switching off the general operation of the engine system 2 is carried out before the exemplified method.

The example of FIG. 4 comprises the steps of:
S1—determining a first temperature T1 in or close to the gas feeding device 7 at a first point in time t1;
S2—determining a second temperature T2 in or close to the gas feeding device 7 at a second point in time t2, which is later (e.g. 5 min) than the first point in time t1;
S3—determining whether T2 is below a pre-set threshold level (e.g. 3° C.) and whether T2 is less than T1 (i.e. whether the temperature is decreasing);
in case T2 is below the pre-set threshold level and T2 is less than T1,
S4—operating the gas feeding device 7 so as to pump any condensed water out from the EGR conduit 6 or at least out from the gas feeding device 7.

Various options are possible after step S4 and what to do depend on the particular application and situation.

In some engine systems, depending e.g. on where the gas feeding device 7 is positioned 30 in the EGR system 5, and in some situations, depending e.g. on how the engine system 2 was operated before switching off and on the values of T1 and T2, it may be that the freezing risk, or at least that the risk of having the gas feeding device 7 damaged due to freezing, is eliminated after step S4. In such a case the method has fulfilled its purpose and can be terminated.

In other cases it may be suitable to repeat the method (where the already determined T2 may form the "first temperature" so that only S2, S3 and, possibly, S4 are repeated, with a new "second temperature" determined in S2). Further repetitions are possible.

In still other cases step S4 may be followed by operating the gas feeding device 7 in a low-power mode in which the capability of the gas feeding device 7 to feed gas is smaller than during normal operational conditions but where the rotary members 71, 72 of the gas feeding device 7 are kept in motion. This "creep mode" is further described above. During operation in low-power ("creep") mode it is suitable to determine whether a rotational friction of at least one of the rotary members 71, 72 exceeds a threshold value, since increased rotational friction might be an indication on that ice has begun to be formed in the gas feeding device 7. The rotational friction can be determined in several ways as described above. In case the threshold value is exceeded, it is suitable to increase a drive power of the drive motor 9 arranged to drive the rotary members 71, 72 to a power level higher than a power level normally used in the low-power mode. This will remove water/ice from the gas feeding device or at least keep the rotary members 71, 72 in motion and prevent them from getting stuck/freezing up.

It is to be understood that the present invention is not limited to the embodiments described above and illustrated in the drawings; rather, the skilled person will recognize that many changes and modifications may be made within the scope of the appended claims.

The invention claimed is:

1. A method for controlling an internal combustion engine system, wherein the internal combustion engine system is provided with an air intake duct, an exhaust gas duct and an exhaust gas recirculation (EGR) system, wherein the EGR system comprises an EGR conduit that fluidly connects the exhaust duct and the intake duct, and wherein a gas feeding device in a form of a positive displacement pump is arranged in the EGR conduit, said gas feeding device being configured to feed exhaust gas from the exhaust duct to the intake duct during operation of the engine system, characterized in that the method comprises the step of:
detecting a risk of freezing of condensed water in the EGR conduit,
detecting non-operation of moving parts of the gas feeding device, and,
in case such a risk is detected and the moving parts of the gas feeding device is not in operation, operating the gas feeding device to pump the condensed water out by the moving parts of the gas feeding device.

2. Method according to claim 1, wherein the step of detecting the freezing risk comprises the step of determining a temperature in or close to the gas feeding device.

3. Method according to claim 2, wherein the step of determining the temperature comprises at least two temperature determinations carried out at different points in time so as to allow a determination of a change of the temperature in or close to the gas feeding device.

4. Method according to claim 1, wherein the step of detecting the freezing risk comprises the step of determining a humidity in the EGR conduit.

5. Method according to claim 1, wherein the step of operating the gas feeding device is carried out so as to pump any condensed water out from the EGR conduit and from the gas feeding device.

6. Method according to claim 1, wherein the step of operating the gas feeding device is carried out by operating the gas feeding device in a low-power mode in which the capability of the gas feeding device to feed gas is smaller than during normal operational conditions but where moving parts of the gas feeding device are kept in motion.

7. Method according to claim 6, wherein the step of operating the gas feeding device in the low-power mode comprises the step of:
  determining whether a rotational friction of a rotary member of the gas feeding device exceeds a threshold value, and,
  in case the threshold value is exceeded,
  increasing a drive power of a drive motor arranged to drive the gas feeding device and the rotary member to a power level higher than a power level normally used in the low-power mode.

8. Method according to claim 1, wherein the method is carried out within a threshold time interval after switching off the internal combustion engine system.

9. Method according to claim 1, wherein the method is carried out within an arbitrary interval after switching off the internal combustion engine system.

10. The method according to claim 1, wherein the gas feeding device is configured to feed exhaust gas by means of at least one rotating member.

11. The method according to claim 1, wherein the gas feeding device is configured to feed exhaust gas by means of a Roots type blower having a pair of rotors provided with meshing lobes.

12. The method according to claim 1, wherein the engine system comprises a drive motor arranged to drive the gas feeding device.

13. An internal combustion engine system provided with an air intake duct, an exhaust gas duct and an exhaust gas recirculation (EGR) system,
  wherein the EGR system comprises an EGR conduit that fluidly connects the exhaust duct and the intake duct, and wherein a gas feeding device in a form of a positive displacement pump is arranged in the EGR conduit, said gas feeding device being configured to feed exhaust gas from the exhaust duct to the intake duct during operation of the engine system,
  characterized in that the engine system is configured to control the steps of claim 1.

14. A vehicle comprising an internal combustion engine system according to claim 13.

15. A computer program product comprising program code means for controlling the steps of claim 1 when said program is run on a computer.

16. A computer readable medium carrying a computer program comprising program code means for controlling the steps of claim 1 when said program product is run on a computer.

17. A control unit for controlling an internal combustion engine according to claim 13, the control unit being configured to perform the steps.

18. The method according to claim 12, wherein the drive motor is an electric motor.

* * * * *